United States Patent
Kunnatur et al.

(10) Patent No.: US 10,983,973 B2
(45) Date of Patent: *Apr. 20, 2021

(54) DATABASE SHARDING WITH INCORPORATED UPDATES

(71) Applicant: Facebook, Inc., Menlo Park, CA (US)

(72) Inventors: Sandhya Kunnatur, Mountain View, CA (US); Soren Bogh Lassen, San Francisco, CA (US); Michael Curtiss, Palo Alto, CA (US); Pilip Pronin, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 346 days.

This patent is subject to a terminal disclaimer.

(21) Appl. No.: 13/899,353

(22) Filed: May 21, 2013

(65) Prior Publication Data
US 2014/0351204 A1 Nov. 27, 2014

(51) Int. Cl.
*G06F 16/22* (2019.01)
*G06F 16/2455* (2019.01)

(52) U.S. Cl.
CPC ........ *G06F 16/22* (2019.01); *G06F 16/24554* (2019.01)

(58) Field of Classification Search
USPC .................. 707/609, 756; 703/609
See application file for complete search history.

(56) References Cited

U.S. PATENT DOCUMENTS

| 8,090,723 B2 | 1/2012 | Cao | |
| 2003/0074256 A1* | 4/2003 | LaCroix | G06Q 30/02 705/14.71 |
| 2009/0144260 A1* | 6/2009 | Bennett | G06F 17/3087 |
| 2011/0040762 A1* | 2/2011 | Flatland et al. | 707/737 |
| 2011/0196855 A1 | 8/2011 | Wable | |
| 2011/0202541 A1 | 8/2011 | Permandla | |
| 2012/0117103 A1* | 5/2012 | Farrelly et al. | 707/769 |
| 2012/0209847 A1 | 8/2012 | Rangan | |
| 2012/0215785 A1 | 8/2012 | Singh | |

OTHER PUBLICATIONS

International Search Report and Written Opinion for International Application PCT/US2014/038956, dated Sep. 24, 2014.

* cited by examiner

*Primary Examiner* — Muluemebet Gurmu
(74) *Attorney, Agent, or Firm* — Jordan IP Law, LLC

(57) ABSTRACT

In one embodiment, a method includes receiving an update of activity associated with one or more content objects associated with a search term. The content objects associated with the search term are indexed on a list of one or more index servers or a term server. The list of the term server include identifier information of one or more content object types. The list of the index servers include identifier information of a single content object type. The method also includes determining whether the search term has a number of associated content objects exceeding a pre-determined threshold number; and modifying the list associated with the search term of a term server or one or more of the index servers based at least in part on the determination and in response to the update.

20 Claims, 6 Drawing Sheets

DATABASE SHARDING WITH INCORPORATED UPDATES

TECHNICAL FIELD

This disclosure generally relates to search algorithms.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a two-pronged architecture of index servers for reducing database load may be provided for querying against a database. A first prong (the "term-sharded" (TS) index) of the architecture may include search terms having N or fewer search results (i.e. a short posting list), wherein the servers may include identifiers for documents of all types (organized by type). A second prong of the architecture may provide a plurality of "doc-sharded" (DS) indices for those search terms having greater than N search results (i.e. a long posting list), wherein each DS index only contains identifiers for documents of one or more particular types (e.g., photos, users, comments, likes, check-ins). When a complex query is received, a top aggregator may look up each search term in the query to determine whether each term has a long posting list or a short posting list. The top aggregator may then accesses the TS index for terms with a short posting list and the DS indices for terms with a long posting list. For example, a search for "Gangnam Style" may comprise two search terms ("Gangnam" and "Style")—wherein "Gangnam" has a short posting list and "Style" has a very long posting list. In this case, a first posting list for "Gangnam" may be pulled from the TS index and a second posting list for "Style" may be pulled from the DS indices (across all relevant document types), and then the intersection of the two sets of document identifiers may be calculated to determine the actual set of search results.

When documents associated with a new term first begin to appear in the social graph, a posting list may be generated for the new term in the TS index, as long as the length of the posting list is less than N. Entries in the posting list may be marked with a document type. Once the length of the posting list exceeds N, chunks of the posting list are distributed into the DS index in accordance with the document types of items in the posting list. If failover occurs during promotion, the newly-live server may query the TS index for the promoted terms. Once all of the pieces have been verified as successfully created in the relevant DS indices, the term and its posting list may be deleted from the TS index.

Any newly-added terms are added to the TS index together with a posting list. Any newly-added document results are added to the TS index and/or DS indices as appropriate—if the newly-added document results trigger promotion, then promotion may also be handled at this point. Any deleted document results are broadcast across the TS index and the DS indices.

DESCRIPTION OF EXAMPLE EMBODIMENTS

Figure 1:
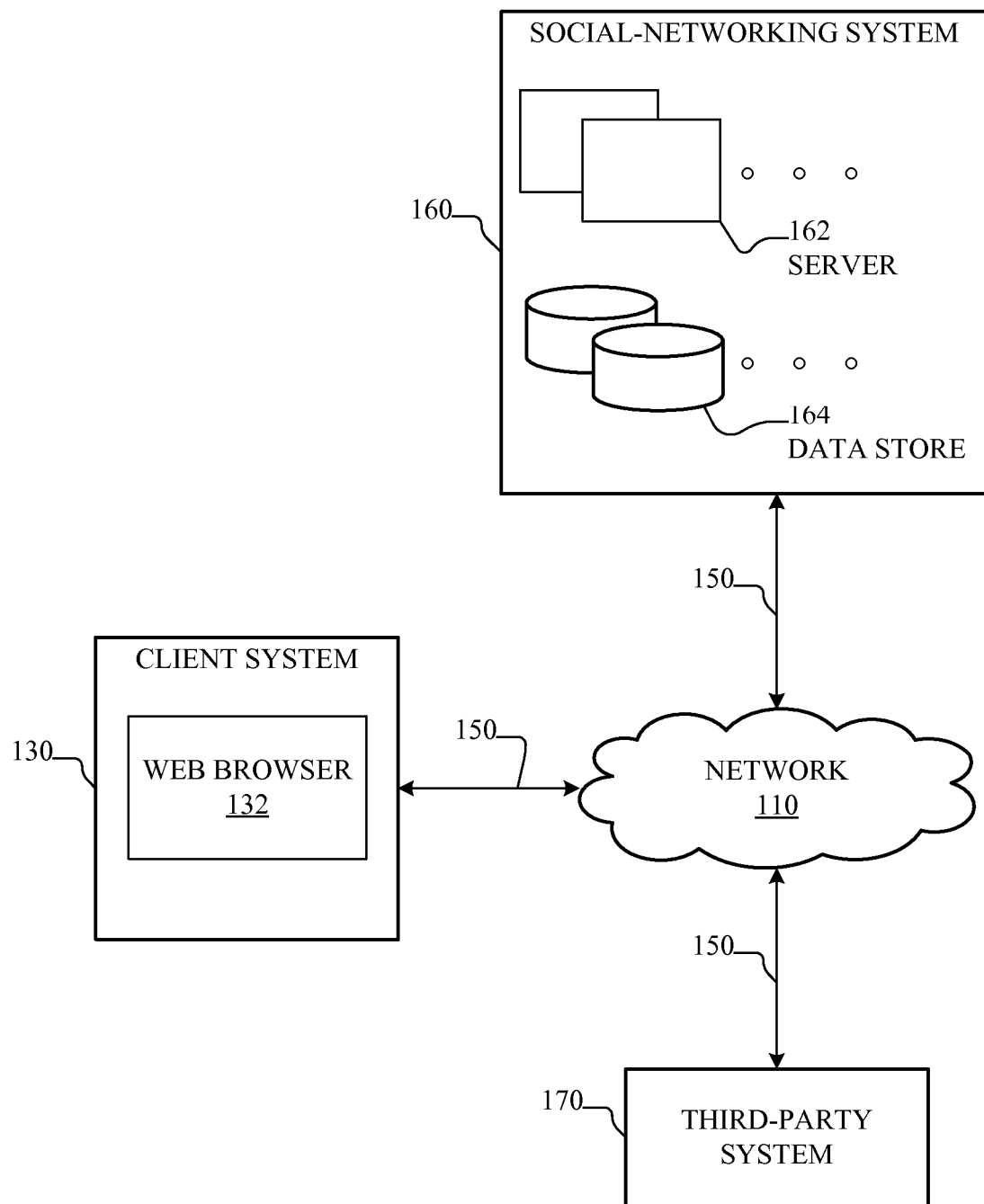
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110. In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposure to third-party-content objects. A notification controller may provide information regarding content objects to a client system 130. Information may be pushed to a client system 130 as notifications, or information may be pulled from client system 130 responsive to a request received from client system 130. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social-networking system 160 may generate, store, receive, and send social-networking data, such as, for example, user-profile data, concept-profile data, social-graph information, or other suitable data related to the online social network. In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream. A collection of data (e.g. content objects) may be stored as a database that is divided into a number of partitions. Each partition may be stored on separate servers 162 or at separate physical locations. Partitions may be distributed over a number of servers 162 (while each partition may be duplicated at geographically diverse locations), the partitioning may also improve performance and reliability in accessing the database. A database may be partitioned by storing rows (or columns) of the database separately (i.e. "sharding"). A database may also be partitioned by using a hashing algorithm. A database may also be partitioned by some real-world segmentation of the data held by the database (e.g. users in each time zone of the United States). In particular embodiments, data or content objects may stored in a number of partitions, each partition holding content objects of a single content object type.

In particular embodiments, a content object uploaded to social-networking system 160 may be stored in a data store 164. Data store information associated with the uploaded or shared content object (e.g. users liking the received content object) may be stored by a search index of social-networking system 160. As described below, a server process of social-networking system 160 may update the search index of one or more data stores 164 in response to activity on social-networking system 160. In particular embodiments, a user-generated content object (e.g. an uploaded image) may correspond to a particular node of a social graph, described below, of social-networking system 160. An edge connecting the particular node and another node may indicate a relationship between the received object and a user (or concept) corresponding to the other node. As an example and not by way of limitation, information associated with the content object or information of one or more edges connecting to a node corresponding to the content object in the social graph may be stored in one or more data stores 164.

In particular embodiments, social-networking system 160 may include an authorization server that allows users to opt in or opt out of having their actions logged by social-networking system 160 or shared with other systems (e.g. third-party systems 170), such as, for example, by setting appropriate privacy settings. The authorization server of social-networking system 160 may be used to enforce one or more privacy settings of the users of social-networking system 160. A privacy setting of a user determines how particular information or content objects associated with the user can be shared. In particular embodiments, the content objects generated or shared by users and provided by social-networking system 160 for presentation as search results, described below, may be restricted by the privacy settings of users of social-networking system 160.

Figure 2:
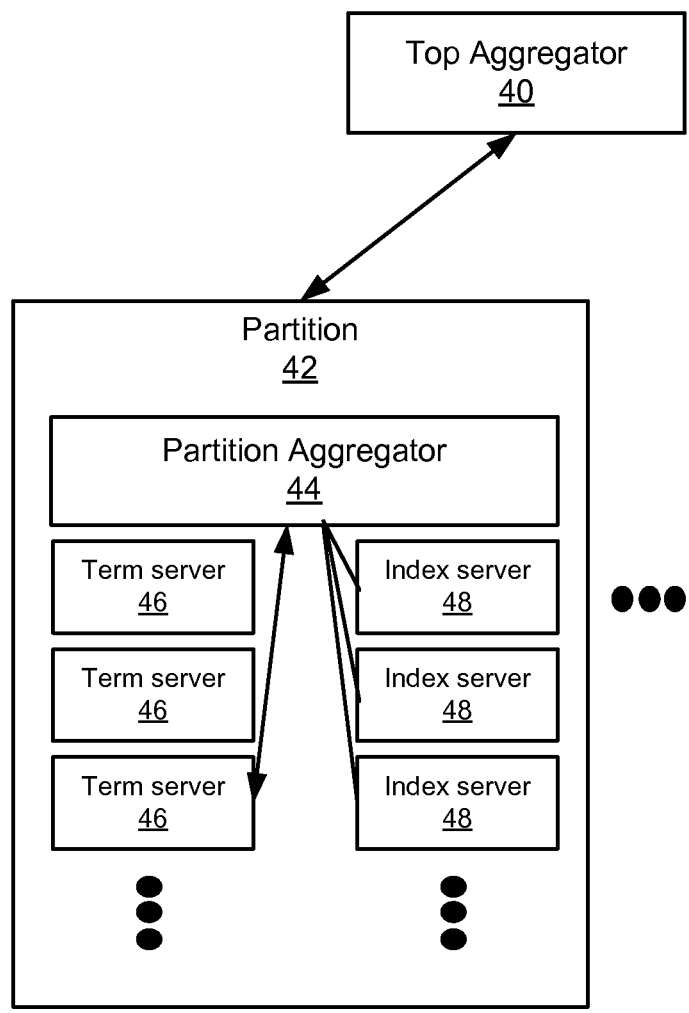
FIG. 2 illustrates an example partitioning of an example search index of a social-networking system.

FIG. 2 illustrates example partitioning of an example search index of a social-networking system. Although this disclosure illustrates and describes performing a search query on a search index with particular types of content objects stored on a particular type of computing system, this disclosure contemplates searching a search index with any suitable type of content stored on any suitable type of computing system. In particular embodiments, a user may submit a query to the social-network system by inputting text into query field of a user interface (UI) of the social-networking system. As an example and not by way of limitation, a user may search for information relating to a specific subject matter (e.g. users, concepts, external content or resource) by providing a phrase describing the subject matter, often referred to as a "search query." The social-networking system may then search one or more partitions 42 to identify content matching the search query. A search may be conducted based on the query phrase using various search algorithms and generate search results that identify resources or content (e.g. user-profile pages, content-profile pages, or external resources) that are most likely to be related to the search query. In response, the search may identify content or content objects that are likely to be related to the search query, each of which may individually be referred to as a "search result," or collectively be referred to as the "search results" corresponding to the search query. The identified content or content objects may include, for example, social-graph elements (i.e. user nodes, concept nodes, or edges), profile pages, external webpages, or any combination thereof. This disclosure contemplates any suitable object types for a social-networking system.

In the example of FIG. 2, one or more of partitions 42 may index content objects of the social networking system. As an example and not by way of limitation, each content object or user of the social-networking system may be indexed based at least in part on a identifier information, such as for example an unique identification number. In particular embodiments, each partition 42 may be configured to access identifier information for content objects stored in respective data storage devices. Content objects stored in each partition 42 may be indexed by a search index of the social-networking system. In particular embodiments, the portion of the search index associated with each partition 42 may be accessed by one or more index servers 48 or one or more term servers 46. Term servers 46 described herein may, where appropriate, refer to a term database server and index servers 48 may refer to an index database server. A database server may provide database services for client systems accessing the social-networking system. Furthermore, each index server 48 or term 46 server may comprise a process executed on one or more computing devices (e.g. server devices 162 described above) and may be executed on the same computing device.

In particular embodiments, term 46 and index 48 servers may include identifier information associated with one or more content object types described above. In particular embodiments, term servers 46 may organize the respective portion of the search index into posting lists associated with identifier information for content objects encompassing substantially all content objects types (e.g. images, video, status updates, or "likes") "posted" on the social-networking system that are associated with a particular search term or "term sharding." Furthermore, the search terms encompassed by the posting lists of term servers 46 may be limited to those with a number of content objects associated with each search term or "hits" below a pre-determined hit-threshold number. In particular embodiments, index servers 48 may organize the respective portion of the search index into posting lists with identifier information corresponding to content objects of a particular content object type (e.g. images) "posted" on the social-networking system that are associated with a particular search term or "doc sharding." Furthermore, the posting list of each index server 48 may include identifier information corresponding to a number of content objects associated with the particular search term above the pre-determined hit-threshold number.

In particular embodiments, the pre-determined hit-threshold number may vary based at least in part on a content-object type, such as for example people, photos, or events, or the particular search term. As an example and not by way of limitation, the pre-determined hit-threshold number may be determined by a number of "hits" contained within a pre-determined percentage (e.g. 99%) of each search term. In particular embodiments, the pre-determined hit-threshold number may be determined based at least in part on an index-to-term-server allocation ratio of computing devices (e.g. servers), latency or throughput analysis of varying the pre-determined hit-threshold number, an aggregate network utilization for sending term server 46 posting lists to or from partition aggregators 44, a frequency of search queries containing a particular search term, the frequency of live updates for a particular search term, constraints specific to a particular family of search terms, or any combination thereof. As an example and not by way of limitation, a constraint specific to a particular family of search terms may be if a user is allowed to have up to 5000 friends, then the pre-determined hit-threshold number for search term "friend" may be set to 5000, such that all "friend" posting lists are contained in term servers 46.

In particular embodiments, a top aggregator 40 may be configured to receive a search query that is distributed to a partition aggregator 44 of each partition 42. As an example and not by way of limitation, a search query may be implemented as a server process hosted by one or more computing devices (e.g. servers 162 described above) of the social-networking system. As an example and not by way of limitation, top aggregator 40 may parse a search query "Gangnam Style" into search terms, such as for example (<Gangnam><style>), that may return search results of any content object type that may match the search query.

In particular embodiments, top aggregator 40 may classify each search term based on a list (e.g. a hash set) of search terms with a number of content objects above the pre-determined hit-threshold number. "Short" search terms described herein may, where appropriate, refer to a search term not contained in the hash set and "long" search terms may refer to a search term that is contained in the hash set. In particular embodiments, a partition aggregator 44 of each partition 42 may parse the search query from top aggregator 40 and extract particular "short" search terms relevant to partition 42 from the search query. In particular embodiments, extraction of one or more "long" search terms contained in the hash set corresponding to search terms relevant to partition 42 may be performed by partition aggregator 44 of each partition 42. As an example and not by way of limitation, search query "Gangnam style" may be may be parsed by top aggregator 40 into search terms <Gangnam> and <Style>. Furthermore, search term <Gangham> may not be contained in the hash set and may be considered a "short" search term, while <style> may be contained in the hash set and may be considered a "long" search term. In particular embodiments, partition aggregator 44 receiving the search terms from top aggregator 40 may execute a particular function to map the particular "short" search terms (e.g. <Gangham>) to a query to one or more of the term servers 46. In particular embodiments, partition aggregator 44 may retrieve one or more posting lists from one or more term servers 46 that include information identifying particular content objects "posted" on the social-networking system that correspond to the particular "short" search terms.

In particular embodiments, extraction of one or more "long" search terms contained in the hash set corresponding to search terms relevant to partition 42 may be performed by partition aggregator 44 of each partition 42. As an example and not by way of limitation, search query "Gangnam style" may be parsed by top aggregator 40 into search terms <Gangnam> and <Style>. In particular embodiments, partition aggregator 44 receiving the search terms from top aggregator 40 may execute a particular function to map the particular "short" search terms sent to a query to one or more of the term servers 46. In particular embodiments, partition aggregator 44 may retrieve one or more posting lists from one or more term servers 46 that include information identifying particular content objects "posted" on the social-networking system that correspond to the particular "short" search terms. Term servers 46 may send the retrieved posting lists corresponding to the particular "short" search terms to partition aggregator 44.

In particular embodiments, the search query from top aggregator 40 may be modified by each partition aggregator 44 to replace one or more "short" search terms with the one or more of the posting lists from term servers 46 that correspond to the "short" search terms. As an example and not by way of limitation, the modified search query may be generated based on the posting lists from term servers 46, such as for example <style>:<5, 7, 10>. In particular embodiments, partition aggregator 44 may send the modified search query to corresponding index servers 48. Partition aggregator 44 may receive one or more posting lists from one or more index servers 48 that include information identifying particular content objects "posted" on the social-networking system that correspond to the particular "long" search terms and search results from term servers 46. As an example and not by way of limitation, posting lists on index servers 48 corresponding to search term <style> may include identifier information corresponding to content items <3, 4, 7, 10> and the result of the modified search query may be <7,10>.

In another embodiment, partition aggregator 44 of each partition 42 may not store information associated with "long" or "short" search terms. Instead partition aggregator 44 may send all of the parsed search terms to associated term servers 46. In particular embodiments, term servers 46 may include a list of "short" and "long" search terms. As an example and not by way of limitation, each search term sent to term servers 46 may return one or more posting lists that include information identifying particular content objects "posted" on the social-networking system that correspond to the particular "short" search terms. Furthermore, term servers 46 may return a flag indicating that one or more of parsed search terms are "long" search terms and the query for the "long" search terms should be routed to index servers 48. In particular embodiments, the query for the "long" search terms may be routed to index servers 48 through partition aggregator 44. In particular embodiments, the query for the "long" search terms may be routed directly to index servers 48 by term servers 46. As described above, index servers 48 may retrieve one or more posting lists from one or more index servers 48 that include information identifying particular content objects "posted" on the social-networking system that correspond to the particular "long" search terms.

In particular embodiments, top aggregator 40 may perform one or more operations on the search results received from partition aggregators 40. As an example and not by way of limitation, top aggregator 40 may return a search result to the user that is an intersection of the search results of all the search terms from term 46 and index 48 servers. For example, the query of term server 46 for search results corresponding to the search term <Gangnam> may yield identifier information <5, 7, 10> that corresponds to particular content objects posted on the social-networking system. As another example, index servers 48 may yield identifier information corresponding to content items <3, 4, 7, 10> for search term <style>. Based on the intersection of the search results sent to partition aggregator 44 from term 46 and index 48 servers 48 of partitions 42, the search result returned to the user may be <7, 10>.

In particular embodiments, the social-networking system may update one or more partitions 42 of the search index based at least in part on activity by users on the social-networking system, such as for example content objects (e.g. an image) being uploaded or generated, or activity (e.g. "liking" or commenting) associated with a content object. Furthermore, one or more partitions 42 of the search index may be updated at pre-determined intervals, such as for example once a week. In particular embodiments, the posting lists of each index server 48 may include a base layer with identifier information that may be updated at the pre-determined intervals and an update layer with identifier information that may be updated in response to activity on the social-networking system, such as new content objects being uploaded to the social-networking system. As an example and not by way of limitation, queries with "long" search terms sent to index servers 48 may access the posting list that includes identifier information of the base layer as well as identifier information of the update layer corresponding to recent activity on the social-networking system described above. In particular embodiments, the identifier information of the base layer may be updated to include identifier information of the update layer during the pre-determined interval. Furthermore, the update layer may be returned to an initial state subsequent to updating the identifier information of the base layer with the identifier information of the update layer. In particular embodiments, identifier information of the posting list of term servers 44 may be periodically updated to include recent activity that occurred during the pre-determined interval.

In particular embodiments, identifier information of the update layer may indicate deletion of a content object as a search result associated with a particular search term in response to a change of state of the corresponding content object, such as for example deletion or "unliking" of the content object. In particular embodiments, index server 48 may provide information distinguishing between identifier information provided from the base layer from identifier information provided by the update layer. In particular embodiments, partition aggregator 42 may determine the intersection of identifier information provided by term servers 46 for the "short" term queries and by index servers 48 for the "long" search term queries. Furthermore, partition aggregator 42 may integrate identifier information from the update layer of term servers 46 with the intersection of identifier information provided by term servers 46 and index servers 48. As example and not by way of limitation, a query of the search term <Gangnam> to respective term server 46 may yield identifier information <5, 7, 10>, a query of the search term <style> to the base layer of the respective index servers 48 may yield identifier information <3, 4, 7, 10>, and the intersection of the queries would be <7, 10>. Furthermore, if content object associated with identifier information <20> is added to the update layer of index server 48 associated with the search term <style>, query of the search term <style> may also yield <20> as a search result. As another example, activity on the social-networking system (e.g. deleting a content object) subsequent an update of the base layer of index server 48 may remove the content object associated with identifier information <10> and indicate on the update layer that identifier information <10> is removed. The search results from the query of the search terms <Gangham><style> may yield <7> after the deleted content object <10> is removed from the search results.

In particular embodiments, the posting lists of each term 46 and index 48 server may include a base layer with identifier information that may be updated at the pre-determined intervals and an update layer with identifier information that may be updated in response to activity on the social-networking system, such as new content objects being uploaded to the social-networking system. In particular embodiments, one or more search terms associated with a recently uploaded content object may be compared with the hash list, described above, to determine whether the identifier information is relevant to posting list of term servers 46, index servers 48, or both. As an example and not by way of limitation, a determination that the recent activity is relevant to a "short" search term, the update layer of the respective term server 46 may be updated with the identifier information corresponding to the recently uploaded content object. As another example, a determination that the recent activity is relevant to a "long" search term, the update layer of the respective index server 48 may be updated with the identifier information corresponding to the recently uploaded content object. In particular embodiments, identifier information corresponding to deleted to content objects may be broadcast to all partitions 42 and the corresponding identifier information removed from all posting lists of both term 46 and index 48 servers that contain the particular identifier information.

In particular embodiments, the identifier information of a particular term server 46 associated with a particular search term may be "promoted" to posting lists of one or more index servers 48 and the identifier information removed from the posting list of the particular term server 46 in response to the number of hits for a particular search term exceeding the pre-determined hit-threshold number. As an example and not by way of limitation, generation of one or more posting lists in one or more term servers 46 may be performed to accommodate the initial addition of one or more search terms to the social-networking system. A search term may be "promoted" from term servers 46 to index servers 48 based at least at least in part on the pre-determined hit-threshold number. As an example and not by way of limitation, a posting list may be generated for the new term in term server 46 posting list, as long as the number of content objects of the posting list is less than the pre-determined hit-threshold number. Identifier information corresponding to the content objects of the posting list associated with the newly added search terms may be marked with a content object type (e.g. image or status update) described above. A determination that the number of content objects of the posting list exceeds the pre-determined hit-threshold number, portions of the posting list associated with the search term are distributed to the posting list of one or more index servers 48 associated with the search term in accordance with the content object type of the content objects in the posting list of term servers 46 associated with the search term.

If a failure occurs during "promotion" of a search term, a newly active server can query one or more term servers 46 for the "promoted" search terms. Once all identifier information associated with the "promoted" search term has been verified as successfully created in the relevant posting lists of index servers 48, the search term and its associated posting list may be deleted from respective term server 46. As an example and not by way of limitation, identifier information may be pushed from term server 46 to index server 48 to populate the posting list of index server 48 associated with the search term.

In particular embodiments, a new base layer of term 46 and index 48 servers may be performed through a rotation of idle computing devices (e.g. servers). When a computing device of the primary architecture goes down, any requests sent to the particular computing device may be re-directed to a corresponding computing device in a backup architecture. Alternatively, any requests may be redirected to top aggregator 40 in the backup architecture may direct the requests to an appropriate computing device. Particular embodiments may facilitate hosting more than one term server 46, more than one index server 48, or any combination thereof on a single computing device. Computing device may be re-distributed on the backup architecture so that when a single computing device in the primary architecture fails, requests to the particular computing device are distributed amongst a plurality of computing devices in the backup architecture. Computing devices may be organized into logical groupings of computing device (e.g. full rack, half-rack, quarter-rack), including one spare logical group of computing devices for replication. During replication or update, the logical groupings may be updated in round-robin fashion, where fresh data for a live logical grouping may be copied to the spare logical grouping. Requests to the live logical grouping may re-directed to the spare logical grouping, and then the live logical grouping becomes the spare logical grouping.

In particular embodiments, top aggregator 40 may aggregate the identifier information corresponding to particular content objects into one or more search results provided by each partition aggregator 44 for presentation to the user. In particular embodiments, top aggregator 40 may aggregate search results of the respective search queries sent to each partition 42. As an example and not by way of limitation, top aggregator 40 may perform an OR operation on the search query results to yield a set of final search results. The social-networking system may rank the content objects that form the search results, such as for example by a number of edges (i.e. a number of known relationships) connecting to a node corresponding to the particular object in the social graph. As an example and not by way of limitation, the social-networking system may rank an image by a number of "likes" associated with the image. As another example, the social-networking system may also rank the image by a number of users tagged on the image.

Figure 3:
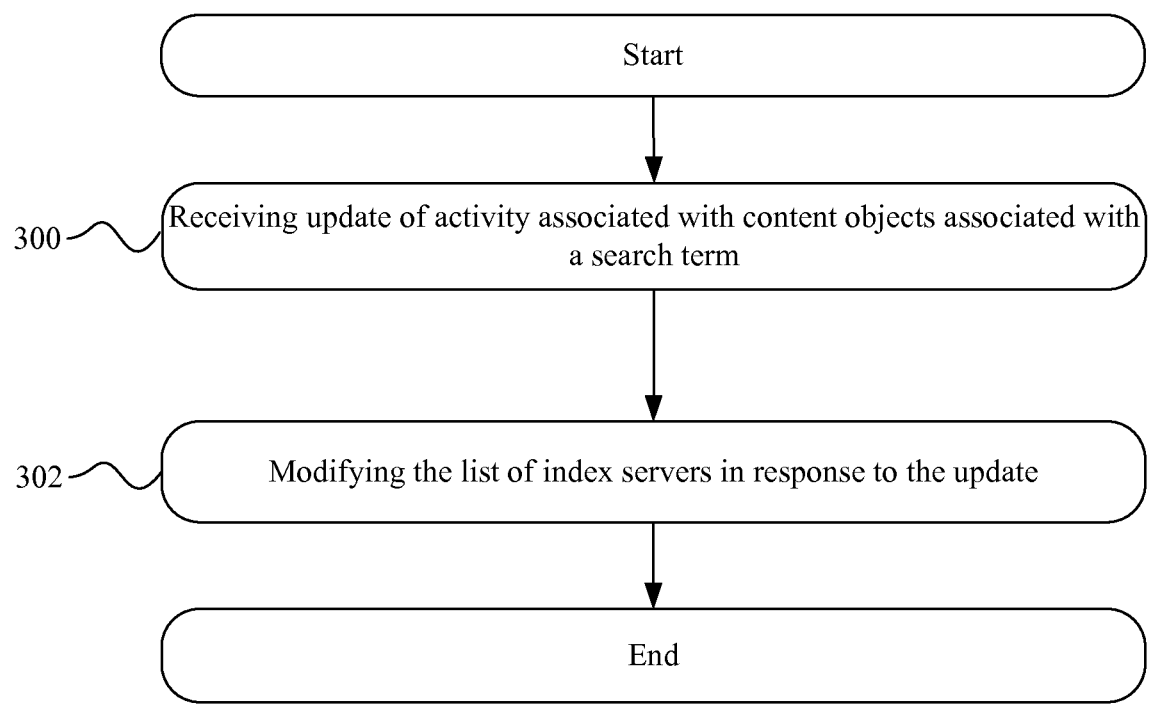
FIG. 3 illustrates an example method for an example search with an update layer.

FIG. 3 illustrates an example method for an example search with an update layer. The method may start at step 300, where one or more computing devices receive an update of activity associated with one or more content objects associated with a search term. In particular embodiments, the search term is associated with a number of content objects that exceeds a pre-determined threshold number. In particular embodiments, the content objects associated with the search term are indexed on a list of one or more index servers. The list includes identifier information that corresponds to the content objects. At step 302, one or more computing devices modify the list of one or more of the index servers in response to the update, at which point the method may end. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Figure 4:
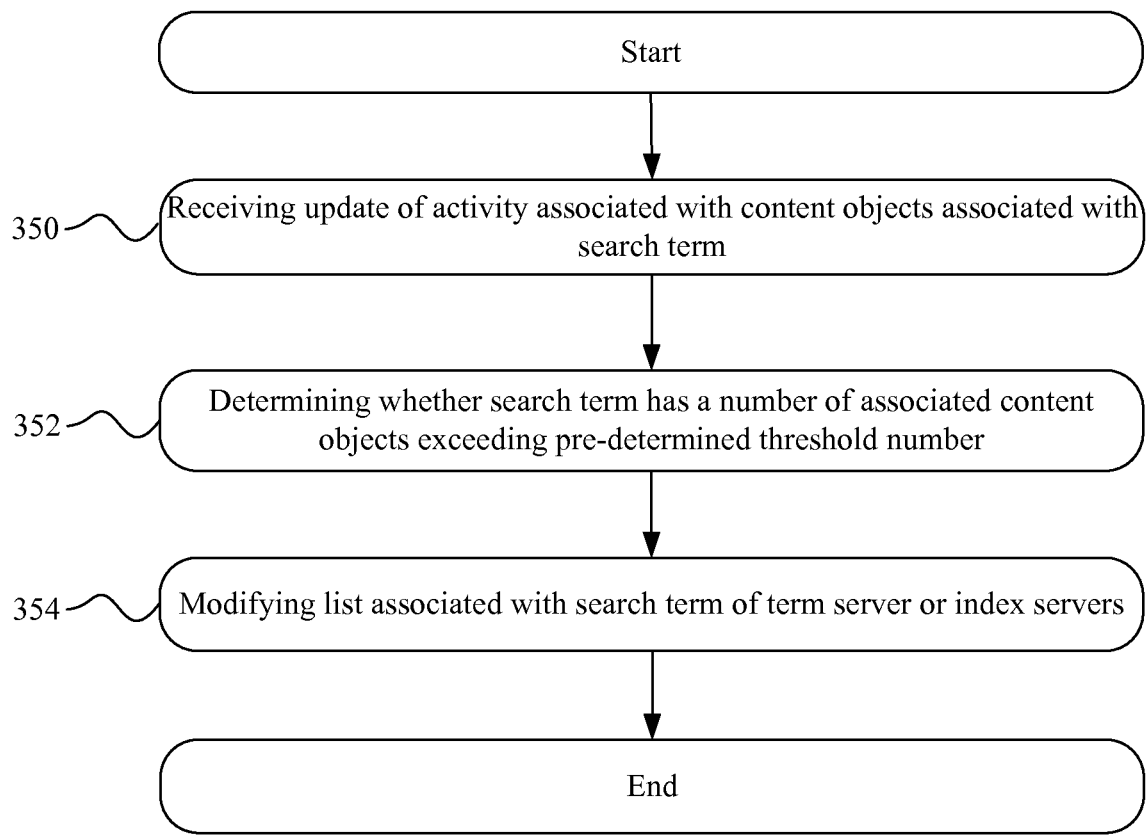
FIG. 4 illustrates an example method for an example search with incorporated updates.

FIG. 4 illustrates an example method for an example search with incorporated updates. The method may start at step 350, where one or more computing devices receive an update of activity associated with one or more content objects associated with a search term. In particular embodiments, the content objects are associated with the search term being indexed on a list of one or more index servers or a term server. In particular embodiments, the list of the term server may include identifier information of one or more content object types. The list of the index servers may include identifier information of a single content object type. Step 352, by one or more computing devices, determine whether the search term has a number of associated content objects exceeding a pre-determined threshold number. At step 354, one or more computing devices modifies the list associated with the search term of a term server or one or more of the index servers based at least in part on the determination and in response to the update, at which point the method may end. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components carrying out particular steps of the method of FIG. 4, this disclosure contemplates any suitable combination of any suitable components carrying out any suitable steps of the method of FIG. 4.

Figure 5:
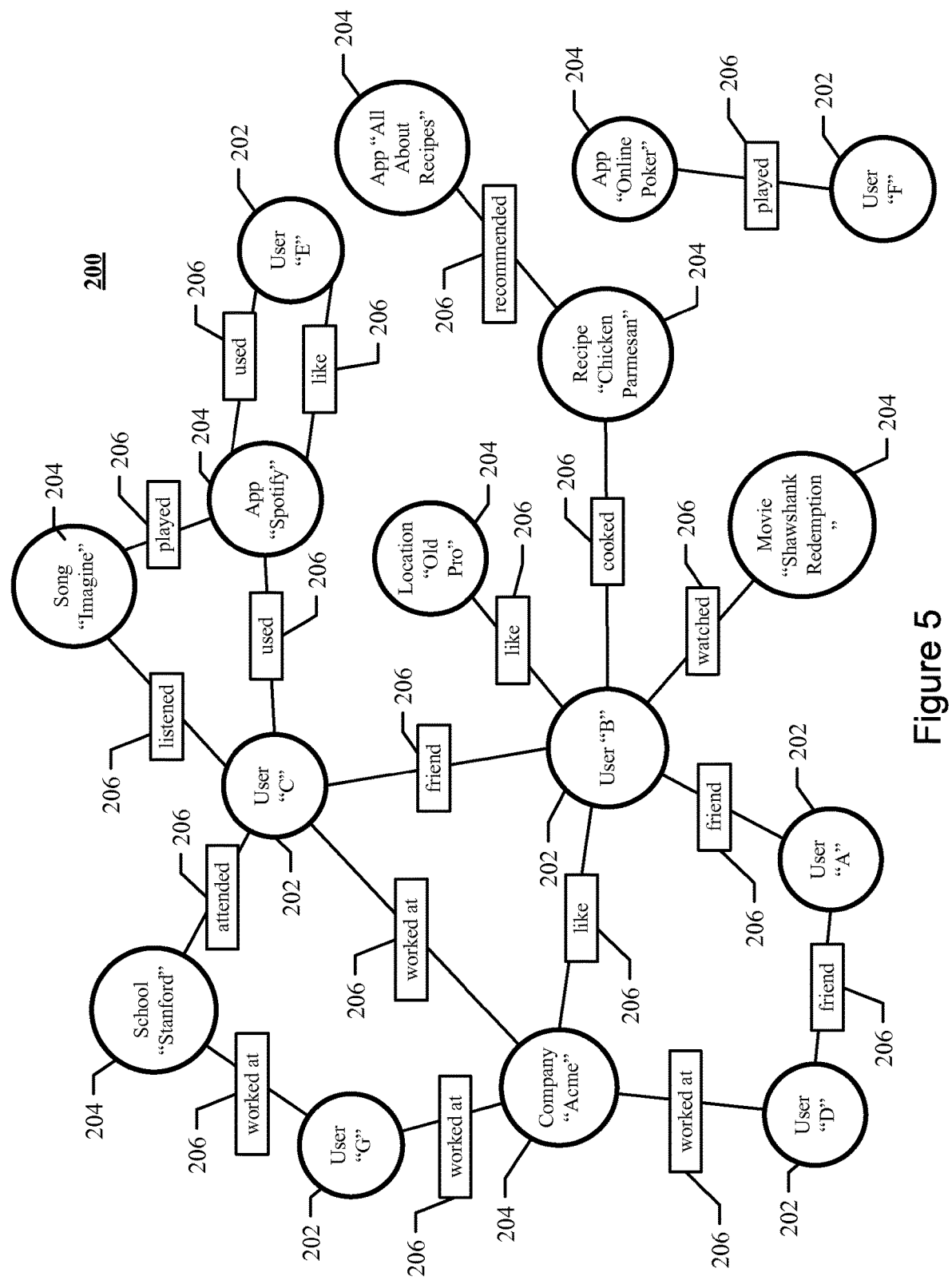
FIG. 5 illustrates an example social graph.

FIG. 5 illustrates an example social graph. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 5 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to transmit to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more data stores 24. In the example of FIG. 5, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 5, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "like" icon. As another example, the socialized dash of a client system may include a selectable "check in" icon (such as, for example, a clickable "check in" icon) or a selectable "like" icon. Similarly, after a user clicks these icons, social-networking system 160 may create a "like" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 5) between user nodes 202 corresponding to the user and concept nodes 204 corresponding to the song and application to indicate that the user listened to the song and used the application. Moreover, social-networking system 160 may create a "played" edge 206 (as illustrated in FIG. 5) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 5 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 6:
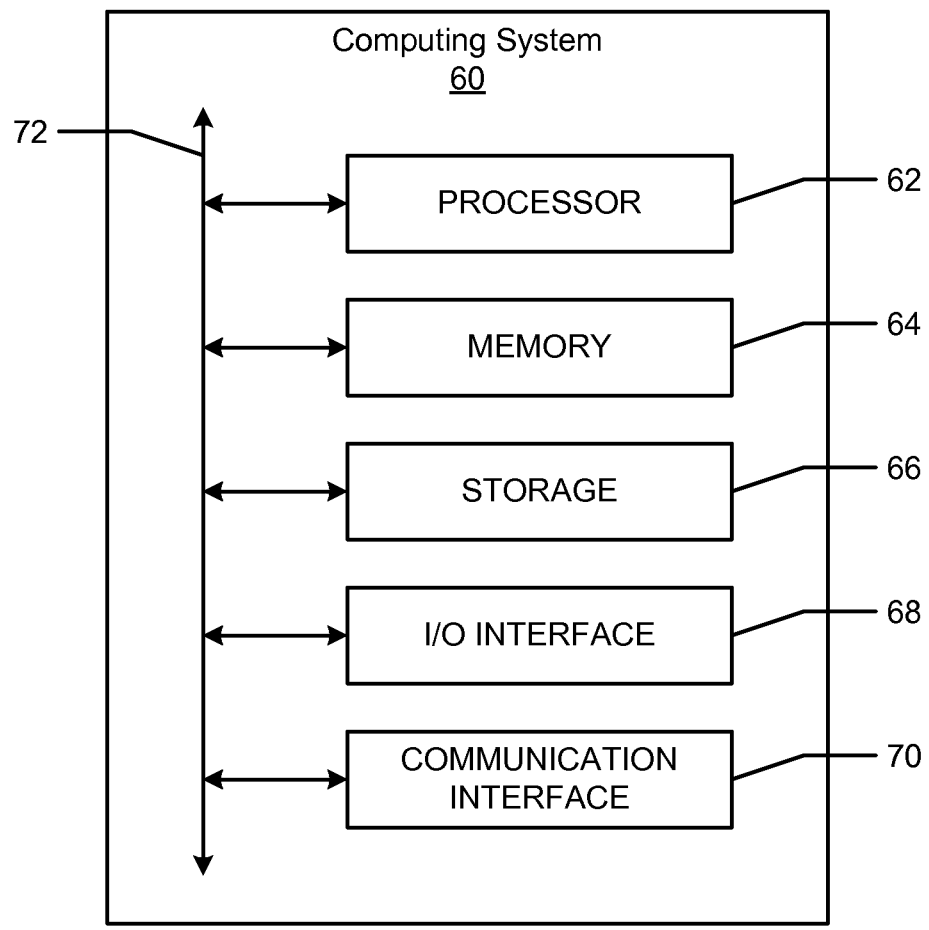
FIG. 6 illustrates an example computing system.

FIG. 6 illustrates example computing system. In particular embodiments, one or more computer systems 60 perform one or more steps of one or more methods described or illustrated herein. In particular embodiments, one or more computer systems 60 provide functionality described or illustrated herein. In particular embodiments, software running on one or more computer systems 60 performs one or more steps of one or more methods described or illustrated herein or provides functionality described or illustrated herein. Particular embodiments include one or more portions of one or more computer systems 60. Herein, reference to a computer system may encompass a computing device, where appropriate. Moreover, reference to a computer system may encompass one or more computer systems, where appropriate.

This disclosure contemplates any suitable number of computer systems 60. This disclosure contemplates computer system 60 taking any suitable physical form. As example and not by way of limitation, computer system 60 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 60 may include one or more computer systems 60; be unitary or distributed; span multiple locations; span multiple machines; span multiple data centers; or reside in a cloud, which may include one or more cloud components in one or more networks. Where appropriate, one or more computer systems 60 may perform without substantial spatial or temporal limitation one or more steps of one or more methods described or illustrated herein. As an example and not by way of limitation, one or more computer systems 60 may perform in real time or in batch mode one or more steps of one or more methods described or illustrated herein. One or more computer systems 60 may perform at different times or at different locations one or more steps of one or more methods described or illustrated herein, where appropriate.

In particular embodiments, computer system 60 includes a processor 62, memory 64, storage 66, an input/output (I/O) interface 68, a communication interface 70, and a bus 72. Although this disclosure describes and illustrates a particular computer system having a particular number of particular components in a particular arrangement, this disclosure contemplates any suitable computer system having any suitable number of any suitable components in any suitable arrangement.

In particular embodiments, processor 62 includes hardware for executing instructions, such as those making up a computer program. As an example and not by way of limitation, to execute instructions, processor 62 may retrieve (or fetch) the instructions from an internal register, an internal cache, memory 64, or storage 66; decode and execute them; and then write one or more results to an internal register, an internal cache, memory 64, or storage 66. In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 64 or storage 66, and the instruction caches may speed up retrieval of those instructions by processor 62. Data in the data caches may be copies of data in memory 64 or storage 66 for instructions executing at processor 62 to operate on; the results of previous instructions executed at processor 62 for access by subsequent instructions executing at processor 62 or for writing to memory 64 or storage 66; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates processor 62 including any suitable number of any suitable internal registers, where appropriate. Where appropriate, processor 62 may include one or more arithmetic logic units (ALUs); be a multi-core processor; or include one or more processors 62. Although this disclosure describes and illustrates a particular processor, this disclosure contemplates any suitable processor.

In particular embodiments, memory 64 includes main memory for storing instructions for processor 62 to execute or data for processor 62 to operate on. As an example and not by way of limitation, computer system 60 may load instructions from storage 66 or another source (such as, for example, another computer system 60) to memory 64. Processor 62 may then load the instructions from memory 64 to an internal register or internal cache. To execute the instructions, processor 62 may retrieve the instructions from the internal register or internal cache and decode them. During or after execution of the instructions, processor 62 may write one or more results (which may be intermediate or final results) to the internal register or internal cache. Processor 62 may then write one or more of those results to memory 64. In particular embodiments, processor 62 executes only instructions in one or more internal registers or internal caches or in memory 64 (as opposed to storage 66 or elsewhere) and operates only on data in one or more internal registers or internal caches or in memory 64 (as opposed to storage 66 or elsewhere). One or more memory buses (which may each include an address bus and a data bus) may couple processor 62 to memory 64. Bus 72 may include one or more memory buses, as described below. In particular embodiments, one or more memory management units (MMUs) reside between processor 62 and memory 64 and facilitate accesses to memory 64 requested by processor 62. In particular embodiments, memory 64 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 64 may include one or more memories 64, where appropriate. Although this disclosure describes and illustrates particular memory, this disclosure contemplates any suitable memory.

In particular embodiments, storage 66 includes mass storage for data or instructions. As an example and not by way of limitation, storage 66 may include a hard disk drive (HDD), a floppy disk drive, flash memory, an optical disc, a magneto-optical disc, magnetic tape, or a Universal Serial Bus (USB) drive or a combination of two or more of these. Storage 66 may include removable or non-removable (or fixed) media, where appropriate. Storage 66 may be internal or external to computer system 60, where appropriate. In particular embodiments, storage 66 is non-volatile, solid-state memory. In particular embodiments, storage 66 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 66 taking any suitable physical form. Storage 66 may include one or more storage control units facilitating communication between processor 62 and storage 66, where appropriate. Where appropriate, storage 66 may include one or more storages 66. Although this disclosure describes and illustrates particular storage, this disclosure contemplates any suitable storage.

In particular embodiments, I/O interface 68 includes hardware, software, or both providing one or more interfaces for communication between computer system 60 and one or more I/O devices. Computer system 60 may include one or more of these I/O devices, where appropriate. One or more of these I/O devices may enable communication between a person and computer system 60. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 68 for them. Where appropriate, I/O interface 68 may include one or more device or software drivers enabling processor 62 to drive one or more of these I/O devices. I/O interface 68 may include one or more I/O interfaces 68, where appropriate. Although this disclosure describes and illustrates a particular I/O interface, this disclosure contemplates any suitable I/O interface.

In particular embodiments, communication interface 70 includes hardware, software, or both providing one or more interfaces for communication (such as for example, packet-based communication) between computer system 60 and one or more other computer systems 60 or one or more networks. As an example and not by way of limitation, communication interface 70 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 70 for it. As an example and not by way of limitation, computer system 60 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 60 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 60 may include any suitable communication interface 70 for any of these networks, where appropriate. Communication interface 70 may include one or more communication interfaces 70, where appropriate. Although this disclosure describes and illustrates a particular communication interface, this disclosure contemplates any suitable communication interface.

In particular embodiments, bus 72 includes hardware, software, or both coupling components of computer system 60 to each other. As an example and not by way of limitation, bus 72 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 72 may include one or more buses 72, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
  by a top aggregator of a social-networking system, receiving an update of user activity associated with one or more content objects associated with a search term that has been parsed from a search query by the top aggregator, wherein the user activity comprises, by one or more users of an online social network, one or more interactions with one or more content objects, each content object being of a particular content-object type of a plurality of different content-object types, each content object being indexed by a first partition aggregator of the social-networking system on a term server, wherein the term server stores a list of identifier information corresponding to content objects of a plurality of different content-object types;
  by the top aggregator, determining whether the search term has a number of associated content objects indexed on the term server exceeding a pre-determined threshold number, wherein the pre-determined threshold number is determined based on the search term; and
  by a second partition aggregator of the social-networking system, responsive to the determination, promoting the identifier information from the term server to one or more index servers of a plurality of index servers, wherein each index server stores a list of identifier information corresponding to content objects of only a single content-object type of the plurality of different content-object types; and
  by the second partition aggregator, after promoting the identifier information to the index servers, deleting the promoted identifier information from the term server.

2. The method of claim 1, wherein each list comprises a base layer and an update layer, wherein the update layer comprises identifier information of the one or more content objects associated with the update and the base layer comprises identifier information of one or more other content objects previously associated with the search term.

3. The method of claim 2, wherein promoting the identifier information from the term server to the one or more index servers comprises, by one or more computing devices, for each of the one or more lists, adding identifier information of the one or more content objects associated with the user activity to the update layer of the list of the respective index server based at least in part on the number of content objects associated with the search term exceeding the pre-determined threshold number.

4. The method of claim 2, wherein promoting the identifier information form the term server to the one or more index servers comprises, by one or more computing devices, adding identifier information of the one or more content objects associated with the user activity to the update layer of the list of the term server based at least in part on the number of content objects associated with the search term being less than the pre-determined threshold number.

5. The method of claim 1, further comprising, by the first partition aggregator, providing an indication to the term and index servers that the one or more content objects associated with the user activity is no longer associated with the search term because the one or more users deleted the one or more content objects.

6. The method of claim 1, further comprising, by the first partition aggregator, generating a new list associated with a new search term on a particular term server in response to the new search term being added to a search index.

7. The method of claim 1, further comprising:
  by the top aggregator, receiving a search query comprising the search term and an other search term;
  by the top aggregator, accessing the list of the term server or the one or more lists of one or more of the index servers associated with the search term;
  by the first partition aggregator, accessing a list of a term server or one or more lists of one or more index servers associated with the other search term;
  by the second partition aggregator, determining one or more search results based at least in part on an intersection of the identifier information of one or more of the lists associated with the search term and one or more of the lists associated with the other search term; and
  by the top aggregator, providing for presentation one or more content objects corresponding to the search results.

8. The method of claim 1, further comprising:
  by the top aggregator, generating one or more lists associated with the search term on one or more index servers in response to the number of content objects associated with the search term exceeding the pre-determined threshold number due to the update;
  by the top aggregator, populating the one or more lists associated with the search term on the one or more of the index servers with identifier information of one or more content objects on a list associated with the search term on a term server; and
  by the top aggregator, deleting the search term and the list associated with the search term on the term server from the term server.

9. One or more computer-readable non-transitory storage media embodying software configured when executed to:
  by a top aggregator of a social-networking system, receive an update of user activity associated with one or more content objects associated with a search term that has been parsed from a search query by the top aggregator, wherein the user activity comprises, by one or more users of an online social network, one or more interactions with one or more content objects, each content object being of a particular content-object type of a plurality of different content-object types, each content object being indexed by a first partition aggregator of the social-networking system on a term server, wherein the term server stores a list of identifier information corresponding to content objects of a plurality of different content-object types;

by a second partition aggregator of the social-networking system, determine whether the search term has a number of associated content objects indexed on the term server exceeding a pre-determined threshold number, wherein the pre-determined threshold number is determined based on the search term; and by the second partition aggregator, responsive to the determination, promote the identifier information from the term server to one or more index servers of a plurality of index servers, wherein each index server stores a list of identifier information corresponding to content objects of only a single content-object type of the plurality of different content-object types; and by the second partition aggregator, after promoting the identifier information to the index servers, delete the promoted identifier information from the term server.

10. The media of claim 9, wherein each list comprises a base layer and an update layer, wherein the update layer comprises identifier information of the one or more content objects associated with the update and the base layer comprises identifier information of one or more other content objects previously associated with the search term.

11. The media of claim 10, wherein promoting the identifier information from the term server to the one or more index servers comprises, for each of the one or more lists, adding identifier information of the one or more content objects associated with the user activity to the update layer of the list of one or more of the index servers based at least in part on the number of content objects associated with the search term exceeding the pre-determined threshold number.

12. The media of claim 10, wherein promoting the identifier information from the term server to the one or more index servers comprises adding identifier information of the one or more content objects associated with the user activity to the update layer of the list of the term server based at least in part on the number of content objects associated with the search term being less than the pre-determined threshold number.

13. The media of claim 9, wherein the software is further configured to provide an indication to the term and index servers that the one or more content objects associated with the user activity is no longer associated with the search term because the one or more users deleted the one or more content objects.

14. The media of claim 9, wherein the software is further configured to generate a new list associated with a new search term on a particular term server in response to the new search term being added to a search index.

15. The media of claim 9, wherein the software is further configured to:

by the top aggregator, receive a search query comprising the search term and an other search term;

by the first partition aggregator, access the list of the term server or the one or more lists of one or more of the index servers associated with the search term;

by the second partition aggregator, access a list of a term server or one or more lists of one or more index servers associated with the other search term;

by the top aggregator, determine one or more search results based at least in part on an intersection of the identifier information of one or more of the lists associated with the search term and one or more of the lists associated with the other search term; and by the top aggregator, provide for presentation one or more content objects corresponding to the search results.

16. The media of claim 9, wherein the software is further configured to:

by the top aggregator, generate one or more lists associated with the search term on one or more index servers in response to the number of content objects associated with the search term exceeding the pre-determined threshold number due to the update;

by the first partition aggregator, populate the one or more lists associated with the search term on the one or more of the index servers with identifier information of one or more content objects on a list associated with the search term on a term server; and by the first partition aggregator, delete the search term and the list associated with the search term on the term server from the term server.

17. A device comprising:
a processor;
a top aggregator;
a first partition aggregator;
a second partition aggregator; and
one or more computer-readable non-transitory storage media coupled to the processor and embodying software that:

by the top aggregator, receive an update of user activity associated with one or more content objects associated with a search term that has been parsed from a search query by the top aggregator, wherein the user activity comprises, by one or more users of an online social network, one or more interactions with one or more content objects, each content object being of a particular content-object type of a plurality of different content-object types, each content object being indexed by the first partition aggregator on a term server, wherein the term server stores a list of identifier information corresponding to content objects of a plurality of different content-object types;

by the second partition aggregator, determine whether the search term has a number of associated content objects indexed on the term server exceeding a pre-determined threshold number, wherein the pre-determined threshold number is determined based on the search term; and by the second partition aggregator, responsive to the determination, promote the identifier information from the term server to one or more index servers of a plurality of index servers, wherein each index server stores a list of identifier information corresponding to content objects of only a single content-object type of the plurality of different content-object types; and by the second partition aggregator, after promoting the identifier information to the index servers, delete the promoted identifier information from the term server.

18. The device of claim 17, wherein each list comprises a base layer and an update layer, wherein the update layer comprises identifier information of the one or more content objects associated with the update and the base layer comprises identifier information of one or more other content objects previously associated with the search term.

19. The device of claim 18, wherein promoting the identifier information from the term server to the one or more index servers comprises, for each of the one or more lists, adding identifier information of the one or more content objects associated with the user activity to the update layer of the list of one or more of the index servers based at least in part on the number of content objects associated with the search term exceeding the pre-determined threshold number.

20. The device of claim 18, wherein promoting the identifier information from the term server to the one or more index servers comprises adding identifier information of the one or more content objects associated with the user activity to the update layer of the list of the term server based at least in part on the number of content objects associated with the search term being less than the pre-determined threshold number.

* * * * *